United States Patent
Shen et al.

(10) Patent No.: US 9,351,306 B2
(45) Date of Patent: May 24, 2016

(54) METHOD AND DEVICE FOR INTER-CELL INTERFERENCE COORDINATION

(75) Inventors: Gang Shen, PuDong Jinqiao Shanghai (CN); Qi Jiang, PuDong Jinqiao Shanghai (CN); Wu Zheng, PuDong Jinqiao Shanghai (CN); Xiaobing Leng, PuDong Jinqiao Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 420 days.

(21) Appl. No.: 13/703,832

(22) PCT Filed: Jun. 22, 2011

(86) PCT No.: PCT/IB2011/001767
§ 371 (c)(1),
(2), (4) Date: Dec. 12, 2012

(87) PCT Pub. No.: WO2011/161539
PCT Pub. Date: Dec. 29, 2011

(65) Prior Publication Data
US 2013/0084907 A1 Apr. 4, 2013

(30) Foreign Application Priority Data

Jun. 22, 2010 (CN) .......................... 2010 1 0206128

(51) Int. Cl.
*H04W 72/08* (2009.01)
*H04W 72/12* (2009.01)

(52) U.S. Cl.
CPC ........ *H04W 72/082* (2013.01); *H04W 72/1226* (2013.01); *H04W 72/1289* (2013.01)

(58) Field of Classification Search
CPC .. H04B 17/345; H04B 7/7097; H04B 1/7103; H04B 2201/70702; H04B 7/04; H04W 16/14; H04W 16/28; H04W 24/00; H04W 24/02
See application file for complete search history.

(56) References Cited

U.S. PATENT DOCUMENTS

2004/0157561 A1* 8/2004 Akerberg .............. H04W 36/20
455/67.11
2005/0096062 A1 5/2005 Ji et al.
(Continued)

FOREIGN PATENT DOCUMENTS

CN 1902966 A 1/2007
EP 2 755 331 A1 7/2014
(Continued)

OTHER PUBLICATIONS

Alcatel-Lucent, "Semi-Static Interference Coordination Method," 3rd Generation Partnership Project (3GPP), 3GPP TSG RAN WG1 #51bis Meeting, R1-Aug. 0281, 6 pages, Sevilla, Spain, Jan. 14-18, 2008.
(Continued)

*Primary Examiner* — Bobbak Safaipour
(74) *Attorney, Agent, or Firm* — Fay Sharpe LLP

(57) ABSTRACT

To address the problem of inter-cell interference, the present invention proposes a method for inter-cell interference coordination and a device thereof. In one embodiment of the present invention, there is provided a method of coordinating radio resource in a base station of wireless communication network, comprising the steps of: S1 determining whether a UE is of interference risk; if the UE is of interference risk, then S2 determining key interference source base station(s) of the UE; S3, scheduling radio resource in collaboration with the key interference source base station(s), so that the key interference source base station(s) idle(s) the radio resource assigned to the UE by the base station. With the method and device provided in the present invention, effective avoidance of inter-cell interference may be achieved, and every cell may fully reuse resource to accomplish reuse gain, while UE backward compatibility may also be supported.

15 Claims, 3 Drawing Sheets

(56) References Cited

U.S. PATENT DOCUMENTS

| | | | |
|---|---|---|---|
| 2007/0004423 A1 | 1/2007 | Gerlach et al. | |
| 2008/0056198 A1 | 3/2008 | Charpentier et al. | |
| 2010/0027513 A1* | 2/2010 | Ikeda | H04W 16/06 370/337 |
| 2010/0069063 A1 | 3/2010 | Osterling et al. | |
| 2010/0159936 A1* | 6/2010 | Brisebois | H04W 72/085 455/450 |
| 2010/0246519 A1* | 9/2010 | Muller | H04W 72/082 370/329 |
| 2012/0142373 A1* | 6/2012 | Kazmi | H04B 17/0077 455/456.1 |
| 2013/0343336 A1* | 12/2013 | Bai | H04W 72/082 370/329 |
| 2014/0064158 A1* | 3/2014 | Timus | H04W 36/30 370/279 |

FOREIGN PATENT DOCUMENTS

| | | |
|---|---|---|
| JP | H11-234734 | 8/1999 |
| JP | 2002-044055 | 2/2002 |
| JP | 2006-513617 | 4/2006 |
| JP | 2008-515257 | 5/2008 |
| WO | WO 2009/052754 A1 | 4/2009 |

OTHER PUBLICATIONS

Huawei, "Soft Frequency Reuse Scheme for UTRAN LTE," 3$^{rd}$ Generation Partnership Project (3GPP), 3GPP TSG RAN WG1 Meeting #41, R1050507, 6 pages, Athens, Greece, May 9-13, 2005.

International Search Report for PCT/IB2011/001767 dated Jan. 19, 2012.

QUALCOMM Incorporated, "LTE Advanced: Heterogeneous Networks," Internet citation URL:http://www.dualcomm.com/documents.pdf, Section 3.2, Feb. 2010, pp. 1-10.

QUALCOMM Europe, Range expansion for efficient support of heterogeneous networks, #GPP TSG-RAN WG1 #54bis, R1-083813, Sep. 29-Oct. 3, 2008, pp. 1-3, Prague, Czech Republic.

\* cited by examiner

METHOD AND DEVICE FOR INTER-CELL INTERFERENCE COORDINATION

TECHNICAL FIELD

The present invention relates to radio communication technology, particularly to the technology about inter-cell interference coordination.

BACKGROUND

While heterogeneous network significantly improve system performance, they also face some problem to be solved, especially downlink (DL) control channel interference in co-channel deployment. As most of control channels (CCH), e.g. physical broadcast channel (PBCH), physical downlink control channel (PDCCH), physical control format indicator channel (PCFICH) and physical HARQ indicator channel (PHICH) are transmitted at the fixed location in signal frames and can not be scheduled to other resource blocks, thus interference to control channels will be caused when co-channel deployment is adopted by cells neighboring to each other, particularly a Macro cell and a neighboring small cell, for example the cell of a relay node, a Pico base station, or a Femto base station. In co-channel deployment, a radio link of a UE is apt to fail under harsh interference conditions.

SUMMARY OF THE INVENTION

One straightforward method against inter-cell interference is DL control channel time offset. Compared with the macro-cell timing, the timing of small cells is offset by some time periods (subframe offset or symbol offset). Thus the collision of control signals between Macro and small cells is avoided. However, time offset causes an unsynchronized network, thereby making it impossible for the implementation of those network applications with synchronization requirements.

Another method proposed to eliminate inter-cell interference is frequency offset with carrier aggregation. Small cells occupy different frequency resource from that of neighbor Macro cell, so as to avoid inter-cell interference. However, the UE needs to implement inter-frequency handover in the case that the UE moves across the cell border, which leads to a increasing difficulty for implementation of hardware/software. What's more, carrier aggregation is not fully supported by the UE in accordance with 3GPP LTE-A Release-8.

Both time offset and frequency offset methods utilize orthogonality of the resources, but complete time/frequency orthogonality may be inefficient due to losing reuse gain.

FIG. 1 illustrates a configuration schematic diagram of a Heterogeneous network. As shown in FIG. 1, there exist a Macro base station 11, a Pico base station 21, a relay node 22, a Femto base station 23 in the network. Signal coverage of relay node 22 substantially falls into the signal coverage of the Macro base station 11, so that the UE served by relay node 22 is apt to suffer strong interference from Macro base station 11. Pico base station 21 is located behind a building, and the interferences suffered by the UEs served by the Pico base station 21 varies greatly due to the existence of blind area of signal coverage (i.e. shadowing area) of the Macro base station 11; for example, UE 31 is located in the blind area of signal coverage of the Macro base station 11, and substantially suffers no interference from Macro base station 11; while UE 32 may suffer intensive interference from the Macro base station 11. The Femto base station 23 is located within the building, and the walls of the building isolate the signals of Macro base station 11 and Femto base station 23 well, therefore UE 35, which is within the building and served by the Femto base station 23, substantially suffers no interference from the Macro base station 11. With the complexity of practical network environment, the simple method of making neighbor base stations occupy orthogonal radio resources decreases reuse gain of the resources to a large extent.

To address the above issue in the prior art, the present invention proposes a method and device for inter-cell interference coordination.

In one embodiment of the present invention, there is provide with a method of coordinating radio resource in a base station of wireless communication network, comprising the steps of: S1. determining whether a UE is of interference risk; and if the UE is of interference risk, then S2. determining key interference source base station(s) of the UE; S3. scheduling radio resource in collaboration with the key interference source base station(s), so that the key interference source base station(s) idle(s) the radio resource assigned to the UE by the base station.

In one embodiment of the present invention, there is provide with a resource coordinating device for coordinating radio resource in a base station of wireless communication network, comprising: a first determining device, a second determining device, a collaborating device; the first determining device being configured to determining whether a UE is of interference risk; and when it is determined that the UE is of interference risk, the second determining device being configured to determine the key interference source base station(s) of the UE; the collaborating device being configured to schedule radio resource in collaboration with the key interference source base station(s), so that the key interference source base station(s) idle(s) the radio resource assigned to the UE by the base station.

With the method and device provided in the present invention, effective avoidance of inter-cell interference may be achieved, and every cell may fully reuse resource to accomplish reuse gain, while UE backward compatibility may also be supported.

BRIEF DESCRIPTION OF THE DRAWINGS

Features, aspects and advantages of the present invention will become more obvious by reading the following description of non-limiting embodiments with the aid of appended drawings.

wherein, same or similar reference numerals refer to the same or similar device (module) or step of method.

DETAILED DESCRIPTION OF EMBODIMENTS

Figure 2:
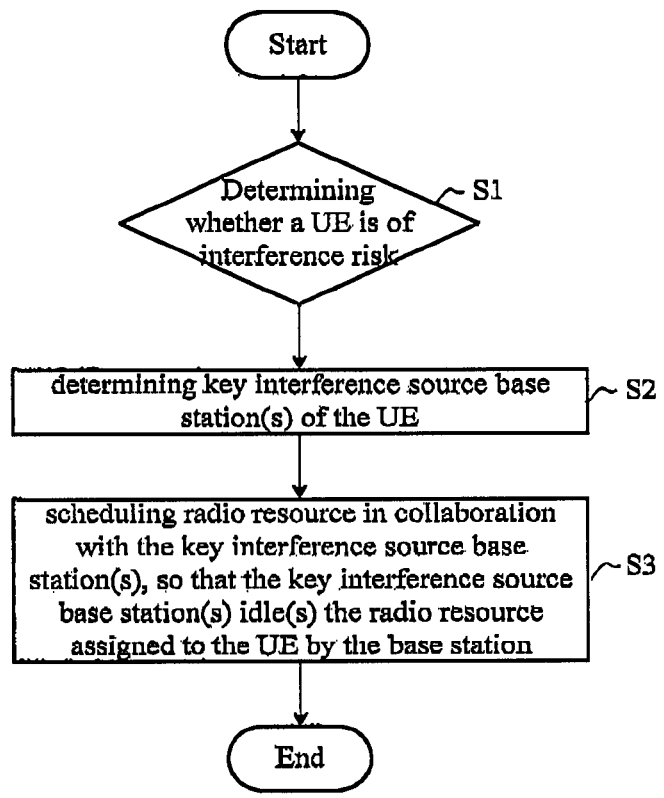
FIG. 2 illustrates a flow chart of a method of coordinating radio resource in a base station of wireless communication network according to an embodiment of the present invention.

FIG. 2 illustrates a flow chart of a method of coordinating radio resource in a base station of wireless communication network according to an embodiment of the present invention. As shown in FIG. 2, the method comprises three steps S1, S2, S3. The method is applicable to any type of base station, such as Macro base station, Pico base station, Femto base station, relay node.

First, in step S1, base station determines whether a UE is of interference risk. If the UE is determined to be of interference risk, then step S2 and S3 is performed in turn; and if the UE is determined to be without interference risk, the performing of step S2, S3 is unnecessary.

In step S2, the base station determines key interference source base station(s) of the UE.

Then, in the step S3, the base station schedules radio resource in collaboration with the key interference source base station(s), so that the key interference source base station(s) idle(s) the radio resource assigned to the UE by the base station.

That is, as for the UE exempt from the interference risk, its serving base station does not have to collaborate with neighbor base station to determine the radio resource thereof. As for the UE exempt from interference risk, its neighbor base station may utilize the same radio resource as that allocated to the UE exempt from interference risk by its serving base station to serve for the UE(s) of the neighbor base station.

For example, the relay node 22 determines, in step S1, that UE 33 is of interference risk; while in step S2, the relay node 22 determines the key interference source of the UE 33, for example, the Macro base station 11; then, in the step S3, the relay node 22 schedules radio resource collaboratively with Macro base station 11, such that the Macro base station 11 idles the radio resource assigned to the UE 33 by relay node 22.

The foregoing method may apply different processing to the UE in different state (with different interference level), therefore having relatively high efficiency for resource utilization. By identifying the key interference source base station(s) and scheduling resource collaboratively therewith, a good interference eliminating effect can be achieved at samller cost of resource reuse gain.

In one embodiment of the present invention, in step S1, the base station evaluates the interference risk therein according to the Signal to Interference and Noise Ratio report from the UE. Specifically, in step S1, if the Signal to Interference and Noise Ratio of the UE is lower than a predetermined value, then the base station determines that the UE is of interference risk. The predetermined value may be different for different type of base station.

In other embodiment(s) of the present invention, in step S1, the base station could also evaluate the interference risk of the UE according to the report of channel quality indicator and so on of the UE.

In one embodiment of the present invention, in step S2, the base station determines the key interference source base station(s) out of neighbor base station(s) according to the matching degree between the interference fluctuation measured by the UE and the signal suppression fluctuation of the neighbor base station(s).

Figure 1:
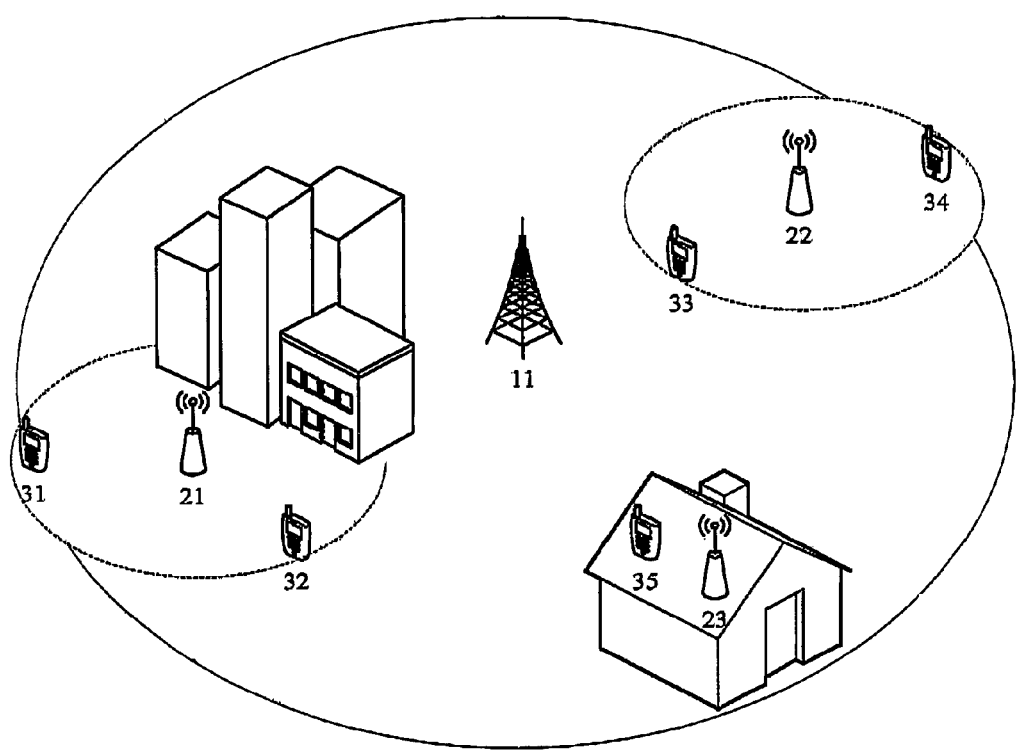
FIG. 1 illustrates a configuration schematic diagram of a Heterogeneous network.

Referring to FIG. 1, specifically, for example, UE 33 continuously measures the interference, and reports the resulting measurement to the relay node 22. The neighbor base station have individual resource configuration, thereby causing a corresponding fluctuation of signal suppression. Relay node 22 determines the key interference source base station(s) according to the matching degree between the interference fluctuation measured by the UE 33 and the signal suppression fluctuation of the neighbor base stations, including the Macro base station 11, Pico base station 21, Femto base station 23.

More specifically, in the case that neighbor base stations idle on different time-frequency resource in accordance with respective configuration, the estimation of interference from the neighbor base station idling on a certain time-frequency resource to the UE may be determined according to interference variation value measured by the UE on the certain frequency resource. For example, the Macro base station 11 idles on subframe n, and the Pico base station 21 idles on subframe m, and the Femto base station 23 idles on subframe p; then the relay node 22 may recognize the interference variation value of the subframe n, detected by UE 33, to be the interference estimation for UE 33 from the Macro base station 11, and recognize the interference variation value of the subframe m to be the interference estimation for UE 33 from Pico base station 21, and recognize the interference variation value of the subframe p to be the interference estimation for UE 33 from the Femto base station 23. The interference estimation may be an average value of measurements of multiple times or multiple frames. The one or more base stations corresponding to the maximum interference estimation will be determined to be the key interference source base station(s) of the UE 33. If the difference among the multiple maximum interference estimations is far less than the difference between the multiple maximum interference estimations and other interference estimation, then the multiple base stations corresponding to the multiple maximum interference estimations may be determined to be as the key interference source base stations of the UE 33, and the numerical comparison standard for 'far less than' may be set according to requirement.

In one embodiment of the present invention, in step S2, the base station identifies the one or more neighbor base stations with a maximum equivalent receiving power between it/them and the UE as the key interference source base station(s) according to the location information of the UE.

Specifically, UE 33 notify the relay node 22 with the location information thereof, or relay node 22 acquires the location information of the UE 33 by means of measurement. The relay node 22 may be informed with the path loss of every neighbor base station, including the Macro base station 11, Pico base station 21, Femto base station 23, according to the location information of the UE 33. Different type of base station has different transmission power standard, the relay node 22 may determines equivalent receiving power between every neighbor base station and the UE 33 according to the difference between the transmission power and path loss of every neighbor base station. The one or more base stations corresponding to the maximum equivalent receiving power will be determined as the key interference source base station(s) of the UE 33. On the occasion that the difference among the multiple maximum equivalent receiving power estimations is far less than the difference between the multiple maximum equivalent receiving power and other equivalent receiving power, then the multiple base stations corresponding to the multiple maximum equivalent receiving power may be determined to be the key interference source base stations of UE 33, and the numerical comparison standard for 'far less than' may be set according to requirement.

In one embodiment of the present invention, in step S2, the base station identifies the one or more neighbor base stations with optimal received signal quality for the UE as the key interference source base station(s) according to received signal quality report of the UE.

Some controlling channel, for example physical downlink control channel, physical HARQ indicator channel, physical control format indicator channel, corresponds to data scheduling, that is, these channels can not be transmitted in a specified subframe without data scheduling in the specified subframe. Therefore, the interference of PDCCH, PHICH, PCFICH can be avoided among different cells by scheduling, without any impact on backward compatibility and the network synchronization of the UE.

The UE in accordance with release 8 protocol of 3GPP LTE-A follows the traditional procedure to detect PDCCH, if its serving node does not transmit any PDCCH, then the UE can not find any scheduling. At this time, the UE assumes no scheduling information thereof on the current subframe, and continues to detect PDCCH of the next subframe. Therefore, some embodiments of the present invention may compatible to those UEs conforming to protocol of Release 8 of 3GPP LTE-A.

In another embodiment of the present invention, step S3 comprise that the base station assign a specified subframe to the UE; and the key interference source base station(s) idle(s) the specified subframe.

Specifically, for example, in the step S3, relay node 22 assigns the specified subframe, e.g. subframe n, to the UE33 determined to be of interference risk, then the key interference source of the UE 33, for example Macro base station 11, will idle subframe n. Moreover, the UE 33 conduct communication in the assigned specified subframe.

Preferably, in the above step S3, the base station assigns the specified subframe to the UE; and the key interference source base station idles the specified subframe for a selected channel, wherein the selected channel comprises one or more of the following: PDCCH, PHICH, PCFICH, DCH.

Specifically, for example, in the step S3, relay node 22 assigns the specified subframe, e.g. subframe n, to the UE33 determined to be of interference risk, then the key interference source of the UE 33, for example Macro base station 11, will not conduct the transmission of PDCCH, PHICH, PCFICH, DCH in subframe n. The inter-cell interference may thereby be avoided. However, the key interference source base station(s) still can conduct the transmission of broadcast channel, synchronization channel and reference signal in subframe n.

In another embodiment of the present invention, the step S3 comprises: the base station assignes selected channel to the UE; the key interference source base station(s) idle(s) the selected channel; wherein the selected channel comprises one or more of the following: PDCCH, PHICH, PCFICH, DCH. The selected channel may be the uplink channel and/or downlink channel.

Figure 3:
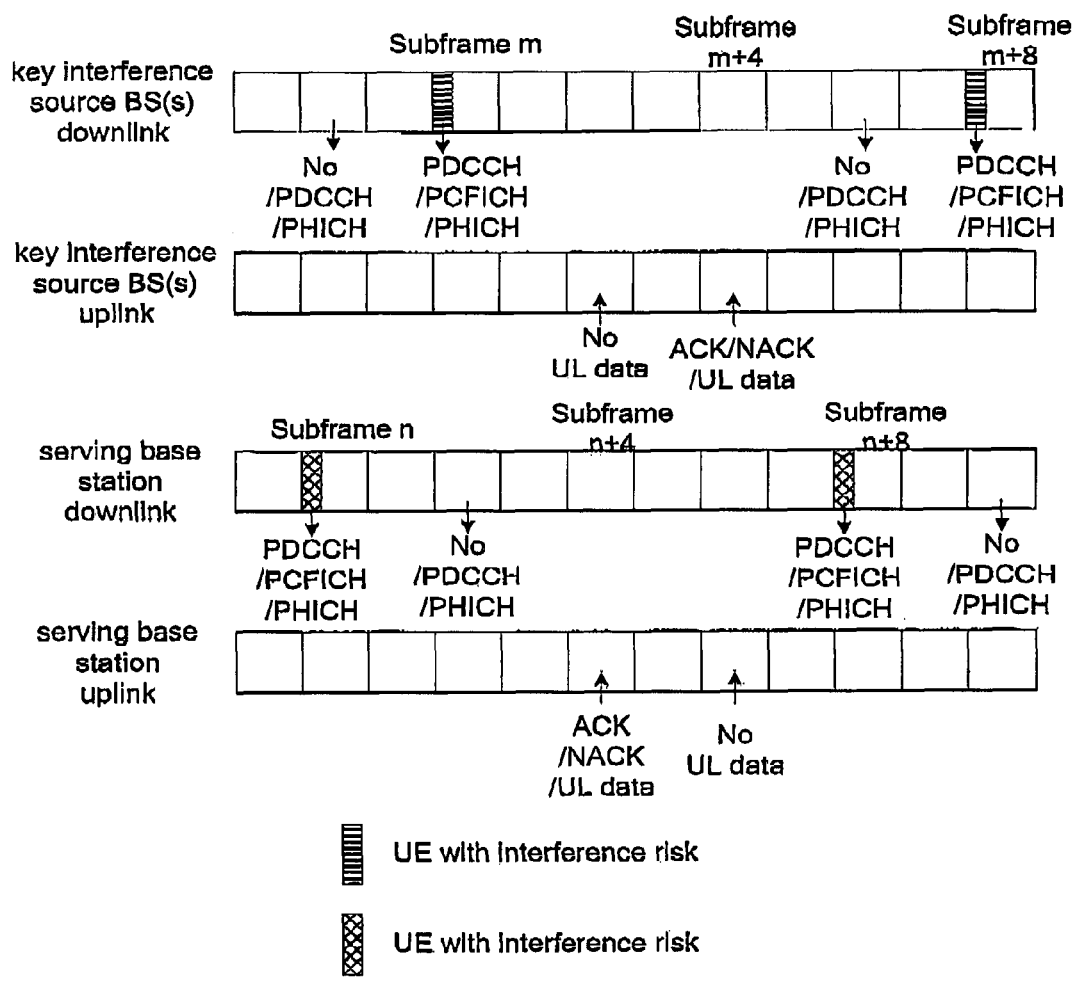
FIG. 3 illustrates a schematic diagram of subframe assignment according to one embodiment of the present invention.

Physical HARQ indicator channel is used for bearing a HARQ ACK/NACK message of the Hybrid Automatic Repeat Request for the previous uplink transmission, for example the uplink transmission in advance across 4 subframes in the mode of frequency division duplexing. FIG. 3 illustrates a schematic diagram of subframe assignment according to one embodiment of the present invention, wherein HARQ timeline is illustrated. In the case that subframe n is assigned, as specified subframe, to the UE with interference risk in the cell of its serving base station, then subframe n+8 is also assigned for potential retransmission; uplink subframe n+4 is used for uplink data of the UE and response to subframe n, with ACK message or NACK message included. In the cell of the key interference source base station of the UE, corresponding uplink subframe is not burdened with data transmission. The UE with interference risk can only conduct transmission in the above specified subframe, while other UE(s) in the cell of its serving base station may conduct transmission in the above specified subframe, or in other subframe. In the cell of the key interference source base station for the UE, the corresponding downlink subframe is idled for the specified channel and data channel.

In another embodiment of the present invention, in the step S3, the base station scheduling radio resource in collaboration with the key interference source base station(s) by means of exchange of resource allocating information.

Specifically, the resource allocating information comprises subframe allocating information.

In another embodiment of the present invention, resource allocation has a distributed management employed, the foregoing step S3 comprise that: the base station determines resource allocation of the UE, requests the key interference source base station(s) to be idle on the resource allocation, and acquires an acknowledgment from the key interference source base station(s).

Specifically, distributed management is utilized for the resource allocation in the system, every base station determines their own resource allocation. For purpose of example but not limitation, the step S3 may comprise the following sub-step:

the base station (for example relay node 22) predetermines the resource allocation for the UE (for example UE 33) with interference risk, and notify the key interference source base station (for example Macro base station 11) with the predetermined resource allocation, so as to request the key interference source to idle the predetermined resource.

the key interference source base station(s) (for example Macro base station 11) approve(s) the request from the base station (for example relay node 22), and acknowledges with a ACK message, idling the predetermined resource.

After the base station (for example relay node 22) receiving ACK message, it allocates the predetermined resource to the UE (for example UE 33) for use.

In the step S3, more than one time of information exchange is often needed. If the key interference source base station (for example Macro base station 11) denies the request from the base station (for example relay node 22), then acknowledges with a NACK message. After the base station (for example relay node 22) receives NACK message, it updates the predetermined resource allocation for the UE (for example UE 33), and notifies the key interference source base station(s) (for example Macro base station 11) with the updated predetermined resource allocation, to request the key interference source base station(s) to idle the updated predetermined resource. Upon acquiring the acknowledgement from key interference source base station(s), the base station allocates the updated predetermined resource for use by the UE, the key interference source base station(s) idle(s) the updated predetermined resource. Preferably, information exchange among base stations is accomplished by X2 interface.

Optionally, the above resource allocation comprises subframe allocation. Preferably, neighboring base stations interchange the pattern of subframe idleness, that is, which subframe(s) should be specified to be idle in a specified period.

In one embodiment of the present invention, the centralized management is adopted for resource allocation, the foregoing step S3 comprise that: the base station notifying a central coordinator with the key interference source base station(s) and the resource needed by the UE, and the central coordinator determining the resource allocation of the base station for the UE and the resource allocation of the key interference source base station(s).

Specifically, a centralized management is adopted for the resource allocation in the system, wherein one base station group is provided with a central coordinator, and the decision about the resource allocation for the UE with interference risk by each base station in the base station group are all made by central coordinator. The base station group is often composed of multiple base stations in geographical adjacency. For example in the base station group comprising the Macro base station 11, the Pico base station 21, the relay node 22, the Femto base station 23, the Macro base station 11 may function as central coordinator. For purpose of example but not limitation, the step S3 may comprise the following sub-steps:

the base station (for example relay node 22) acquires the resource needed by the UE (for example UE 33) with interference risk, and notifies the central coordinator with the resource needed by the UE and key interference source base station(s) (for example Macro base station 11);

the central coordinator schedules the resource allocation in a unified mode, and determines the resource allocation for the UE (for example UE 33) by the base station (for example relay node 22) and the resource allocation of the key interference source base station(s) (for example Macro base station 11), so as to differentiate the resource allocation of the key interference source base station(s) from the resource allocation for the UE by the base station.

Optionally, the above resource allocation comprises subframe assignment. Preferably, the central coordinator notifies each base station with the configured pattern of subframe idleness, that is, which subframe(s) should be specified to be idle in a specified period.

Preferably, resource configuration among the neighbor base stations for avoidance of interference upon the UE with interference risk may be dynamically updated according to the interference variation of the UE, the variation of service traffic flow and so on.

In another embodiment of the present invention, in the step S3, the base station the base station scheduling radio resource in collaboration with the key interference source base station(s) by means of exchange of UE information. Specifically, the UE information may comprise: UE indicator, interference level (dBm), key interference source indicator. Preferably, centralized management is adopted for the resource allocation in the system. The central coordinator collects the UE information of each base station, and decides the resource allocation for each base station in a unified mode. If it is determined that serving base station of the UE with interference risk serves such UE in some subframe, then it is determined that the key interference source base station(s) of the UE conducts no transmission of selected channel in such subframe, such as PDCCH, PHICH, PCFICH, DCH.

Those skilled in the art should appreciate, the foregoing embodiments are all exemplary rather than restrictive. The above methods are applicable to any type of base station, including Macro base station, Pico base station, Femto base station, relay node, and so on. The above methods particularly apply to the base station having relatively small transmission power and signal coverage with respect to Macro base station, such as Pico base station, Femto base station, relay node, and so on.

Figure 4:
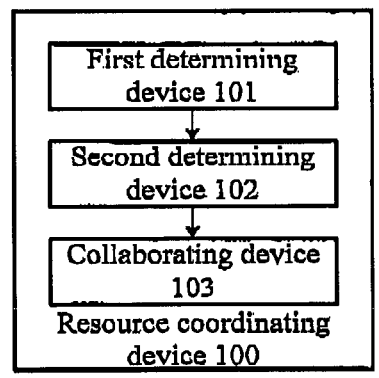
FIG. 4 illustrates a function block diagram of a resource coordinating device for coordinating radio resource in a base station of wireless communication network.

FIG. 4 illustrates a function block diagram of a resource coordinating device for coordinating radio resource in a base station of wireless communication network. As shown in FIG. 3, the resource coordinating device 100 of such embodiment comprises: a first determining device 101, a second determining device 102, a collaborating device 103. The resource coordinating device 100 is typically configured inside the Macro base station 11, Pico base station 21, relay node 22, or Femto base station 23.

The first determining device 101, the second determining device 102, the collaborating device 103 are respectively configured to perform the step S1, S2, S3 in the foregoing method.

The first determining device 101 is configured to determine whether a UE is of interference risk.

When it is determined that the UE is of interference risk, the second determining device 102 is configured to determine the key interference source base station(s) of the UE; the collaborating device 103 is configured to schedule radio resource in collaboration with the key interference source base station(s), so that the key interference source base station(s) idle(s) the radio resource assigned to the UE by the base station.

Those skilled in the art could readily appreciate, the device in the present invention can be implemented by means of either hardware module, functional module of software, or the hardware module with functional module of software incorporated therein.

Those skilled in the art could readily appreciate, the above embodiment are intended to be exemplary but not limited thereto. Different technical feature in various embodiments can be combined, so as to gain some technical effect. After examining the accompanying figures, specification and claims, those skilled in the art should readily appreciate and carry out some variation for the above disclosed embodiments. In the claims, the term of "comprise" does not exclude the existence of other device(s) or step(s); indefinite article "a/an" does not exclude the "multiple" case; term of "a first", "a second" is just used for give a name rather than for representing some particular order. Figure number(s) in the claims, if any, should not be construed to be any restriction to protection scope. Multiple component functionalities in the claim(s) may be implemented by means of an singular hardware or software. The occurrence of some technical features in different dependent claims does not eliminate the possibility of the technical effect resulting from the combination of these technical features.

What is claimed is:

1. A method of coordinating a radio resource in a base station of wireless communication network, comprising:
    determining whether a UE is of interference risk;
    if said UE is of interference risk, then
    determining key interference source base station(s) of said UE; and
    scheduling said radio resource in collaboration with said key interference source base station(s), so that said key interference source base station(s) idle(s) the radio resource assigned to said UE by said base station.

2. The method according to claim 1, wherein said determining whether a UE is of interference risk comprises:
    determining said UE to be of interference risk if the signal to interference and noise ratio of said UE is lower than a predetermined value.

3. The method according to claim 1, wherein said determining key interference source base station(s) of said UE comprises:
    determining said key interference source base station(s) out of neighbor base station(s) according to a matching degree between the interference fluctuation measured by said UE and a signal suppression fluctuation of said neighbor base station(s).

4. The method according to claim 3, wherein said determining key interference source base station(s) of said UE comprises:
    on a basis that neighbor base stations idle on different time-frequency resource in accordance with respective configuration, determining an estimation of interference from the neighbor base station idling on a certain time-frequency resource to said UE according to an interference variation value measured by said UE on said certain frequency resource.

5. The method according to claim 1, wherein said determining key interference source base station(s) of said UE comprises:
   identifying the one or more neighbor base stations with a maximum equivalent receiving power between it/them and said UE as said key interference source base station(s) according to the location information of said UE.

6. The method according to claim 1, wherein said determining key interference source base station(s) of said UE comprises:
   identifying the one or more neighbor base stations with optimal received signal quality for said UE as said key interference source base station(s) according to received signal quality report of said UE.

7. The method according to claim 1, wherein said scheduling comprises:
   said base station assigning a specified subframe to said UE; and
   said key interference source base station(s) idling said specified subframe.

8. The method according to claim 1, wherein said scheduling comprises:
   said base station assigning a selected channel to said UE; and
   said key interference source base station(s) idling said selected channel;
   wherein said selected channel comprises one or more of the following: physical downlink control channel (PDCCH), physical HARQ indicator channel (PHICH), physical control format indicator channel (PCFICH), data channel (DCH).

9. The method according to claim 1, wherein, in said scheduling, said base station schedules said radio resource in collaboration with said key interference source via an exchange of resource allocating information.

10. The method according to claim 9, wherein said resource allocating information comprises subframe allocating information.

11. The method according to claim 9, wherein said scheduling comprises: said base station determining said resource allocation of said UE, requesting said key interference source base station(s) to be idle on said resource allocation, and acquiring an acknowledgment from said key interference source base station(s).

12. The method according to claim 9, wherein said scheduling comprises: said base station notifying a central coordinator with said key interference source base station(s) and the resource needed by said UE, and said central coordinator determining said resource allocation of said base station for said UE and a resource allocation of said key interference source base station(s).

13. The method according to claim 1, wherein, in said scheduling, said base station schedules said radio resource in collaboration with said key interference source base station(s) by means of exchange of UE information.

14. The method according to claim 1, wherein said base station comprises at least one of: a relay node, a Pico base station, a femto base station.

15. A resource coordinating device for coordinating a radio resource in a base station of wireless communication network, comprising: a first determining device, a second determining device and a collaborating device;
   said first determining device being configured to determining whether a UE is of interference risk;
   when it is determined that said UE is of interference risk, said second determining device being configured to determine the key interference source base station(s) of said UE; and
   said collaborating device being configured to schedule said radio resource in collaboration with said key interference source base station(s), so that said key interference source base station(s) idle(s) the radio resource assigned to said UE by said base station.

* * * * *